Nov. 22, 1955  F. L. DAVIS  2,724,163
RELEASABLE FASTENER WITH FLUSH CLOSURE
Filed May 13, 1953  2 Sheets-Sheet 1
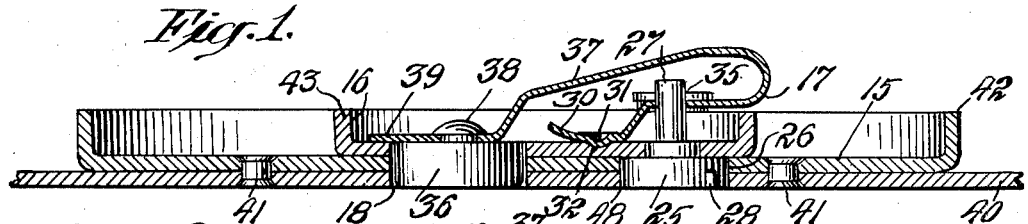
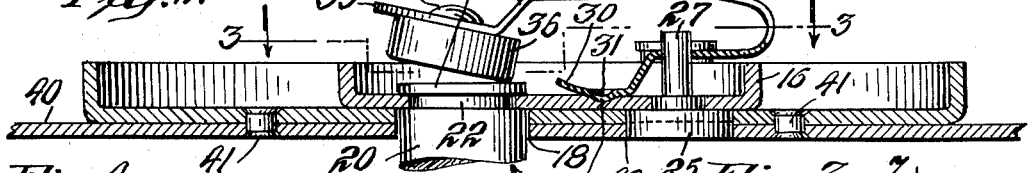
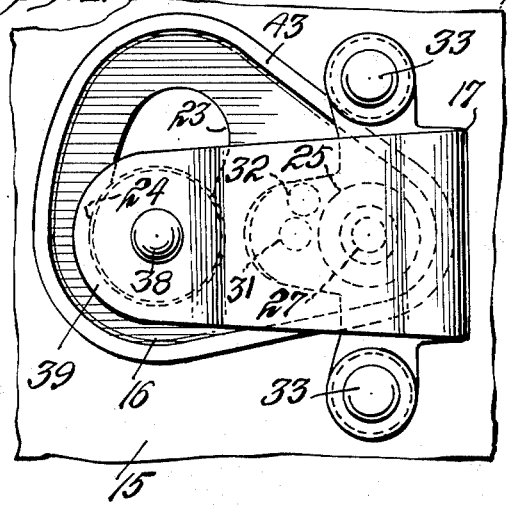
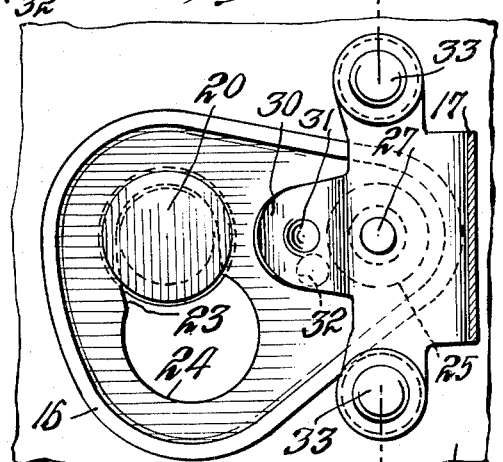
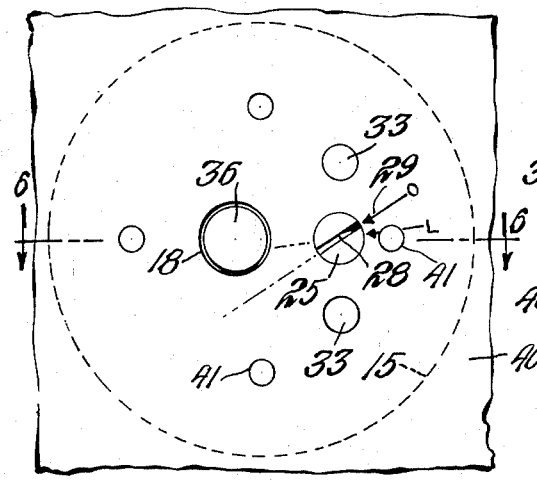
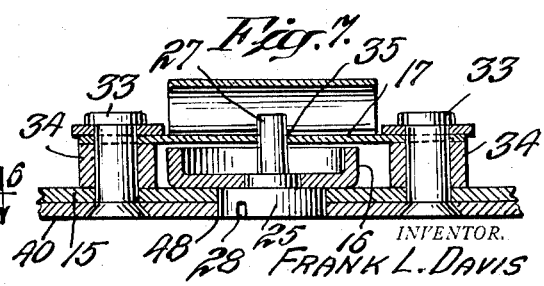
INVENTOR.
FRANK L. DAVIS
BY
ATTORNEY Nov. 22, 1955 F. L. DAVIS 2,724,163
RELEASABLE FASTENER WITH FLUSH CLOSURE
Filed May 13, 1953 2 Sheets-Sheet 2
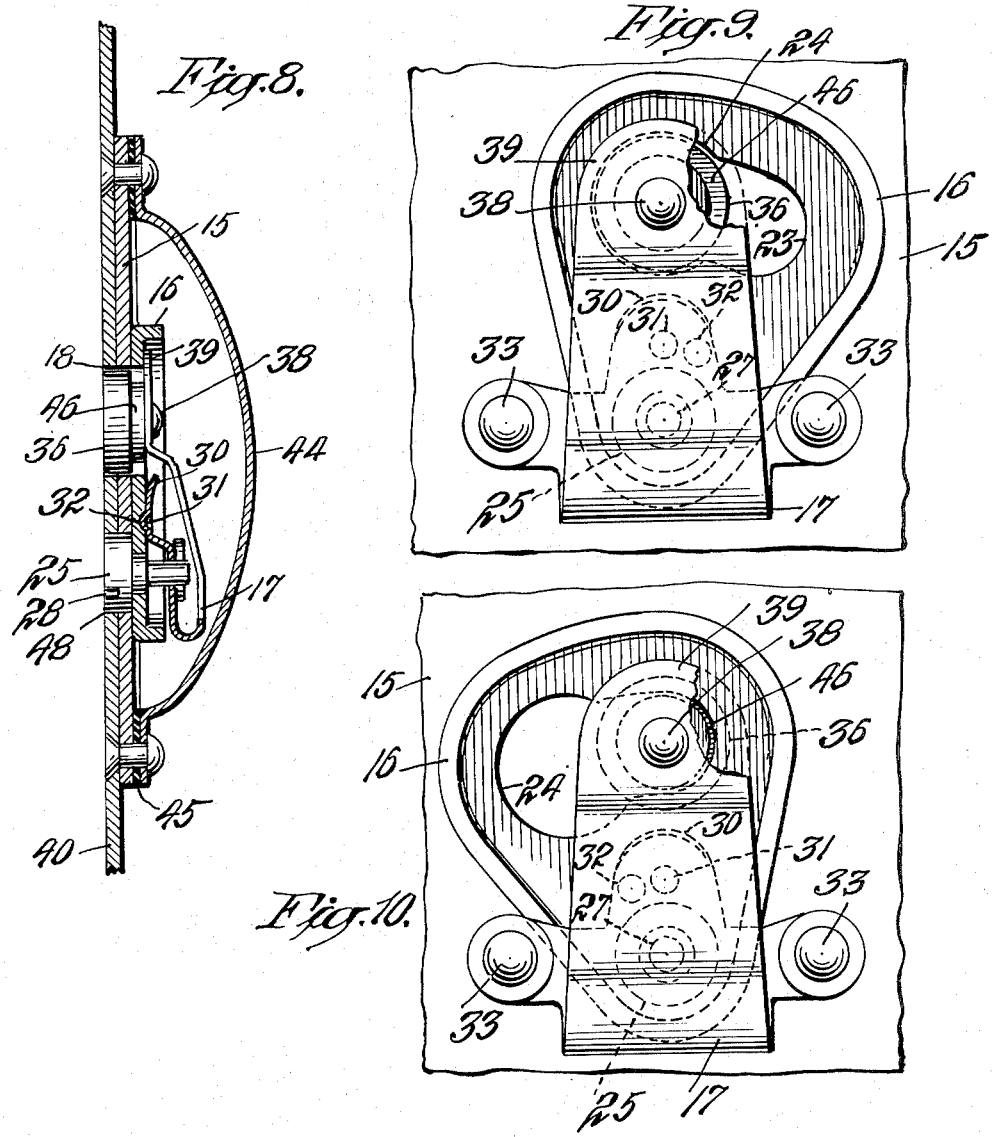
INVENTOR.
FRANK L. DAVIS
BY
ATTORNEY

United States Patent Office 2,724,163
Patented Nov. 22, 1955

2,724,163

RELEASABLE FASTENER WITH FLUSH CLOSURE

Frank L. Davis, College Point, N. Y., assignor to Davis Aircraft Products Inc., New York, N. Y., a corporation of New York Application May 13, 1953, Serial No. 354,699

6 Claims. (Cl. 24—223)

The invention herein disclosed relates to releasable fasteners of the type covered in copending patent application Serial No. 117,475 filed September 23, 1949, now Patent No. 2,647,294 of August 4, 1953, in which a stud-like element inserted through an opening in a support is releasably held by a shear plate at the back of the support, engaged in a transverse groove in the inserted portion of the stud.

The present invention is more particularly concerned with the provision of a closure for the opening in the support which will come into operation automatically when the stud is removed to plug up the opening and leave the exposed surface, such as the floor, wall, ceiling or skin of an aircraft, flush and smooth.

Special objects of the invention are to provide this fastener construction in a simple, inexpensive form taking up but small space, and light in weight but strong and rugged and otherwise generally suited to aircraft use.

Other special objects of the invention are to construct the device of sheet metal parts readily manufactured by simple punch press operations, and in such form as to be generally adaptable to mounting in various positions on airframes and the like.

Other desirable objects attained by the invention are set forth and will appear in the course of the following specification in which the novel features of the invention are described and claimed.

The drawings accompanying and forming part of this specification illustrate certain present practical embodiments of the invention. Structure, however, may be modified and changed as regards the immediate illustration, all within the true intent and broad scope of the invention as hereinafter defined and claimed.

Fig. 1 in the drawings is a broken cross sectional view of one of the fasteners applied to the skin of an airframe, showing it in the closed, unused position;

Fig. 2 is a similar view showing the grooved end of a stud member inserted and secured in the fastener;

Fig. 3 is a broken plan view on the plane of line 3—3 of Fig. 2, showing the stud member in position secured by the shear plate;

Fig. 4 is a similar plan view but showing the shear plate shifted to the release position and the plug extended to close the opening in the supporting plate;

Fig. 5 is an internal view illustrating appearance of the fastener as applied to the inner surface of an airplane skin, the latter indicated broken away;

Fig. 6 is an enlarged broken sectional view on substantially the plane of line 6—6 of Fig. 5;

Fig. 7 is an enlarged broken sectional detail showing mounting and arrangement of the retainer spring on substantially the plane of line 7—7 of Fig. 3;

Fig. 8 is a broken sectional detail showing how the fastener may be enclosed airtight for pressurized cabins;

Figs. 9 and 10 are broken sectional views showing how the shear plate may be used to release or to lock the closure plug in place.

As shown in the drawings, the invention comprises three main parts—a support 15 in the nature of a plate adapted to be secured, for instance, to the skin or framework of an airplane, a shear plate 16 at the back of said support and a spring retainer 17 in back of the shear plate and holding it tensioned against the supporting plate.

The supporting plate is shown as having an opening 18 to pass the head portion 19 and accommodate the corresponding size stem portion 20, Fig. 2, of the bolt or stud-like member 21.

The secured member 21 may be a stud on the leg of a chair or table, a ring bolt for tie-down equipment, a stud on a partition wall, shelf, ladder, scaffolding, cowling or other structure, the fastener disclosed being adapted to secure, definitely position, support and hold various kinds of such objects.

Between the entering head portion 19 and the corresponding centering portion 20, the member 21 has a reduced neck portion 22 of a width slightly greater than the thickness of the shear plate 16, and of a diameter slightly less than the diameter and width of the smaller portion 23 of a keyhole slot formed in the shear plate.

The larger portion 24 of this keyhole slot is of slightly greater diameter than the head 19 of the secured member so as to readily pass the same when the shear plate is in the open position shown in Figs. 1 and 4, with this larger portion in registry with the opening 18 in the supporting plate.

Pivotal mounting of the shear plate is effected in the illustration by a stud 25 welded or otherwise fixed to the shear plate and rotatably seated in a circular opening 26 provided in the supporting plate.

This pivot stud is shown as having an extended stem 27 at the back and as seating flush in the bearing 26 and as having an exposed cross slot 28 to receive a screwdriver or other turning implement.

Further, the screw-driver slot 28 is utilized in the illustration as an index to register with markings 29, such as "Locked," "Unlocked," or "Closed," "Open," or the like, to show actual positions of the shear plate at the back of the supporting plate.

The retainer 17 is in the nature of a thin plate of spring steel or the like, having a projecting tongue or extension 30 bearing against the back of the shear plate and shown as having an embossment 31 engageable in seats 32 in the shear plate positioned to locate and hold the shear plate in its different positions of adjustment.

Spring retainer plate 17 is shown secured in properly spaced relation at the back of the supporting plate, by widely spaced rivets 33 and spacing washers 34, Fig. 7.

As shown in Figs. 1, 2, 6 and 7, the extended stem 27 of the pivot stud 25 has a bearing in an opening 35 in the retainer plate to steady and provide spaced bearings for the pivot stud.

A flush closure is provided for the opening in the supporting plate in the form of a plug 36 shaped to substantially fill this opening, and this plug is automatically removed and replaced upon insertion and removal of the stud member 20, by being carried on the end of a spring arm 37 extended from the retainer plate 17. This spring arm is shown as doubled back from the edge of the plate farthest removed from opening 18 so as to give it desired freedom of movement for the plug to be pushed by the entering stud, back fully clear of both the supporting plate and the shear plate, as indicated in Fig. 2.

The plug may be riveted or otherwise suitably secured to the free end of the doubled-over spring arm, as indicated at 38.

To definitely limit the extent of projection of the plug to a point where it will be flush with an external surface, the free end of the spring supporting arm 37 is shown as extended at 39 beyond the edge of the plug to act as a stop against the back of the shear plate 16, Fig. 1. In this view the fastener is shown secured directly to the back of an airplane skin 40 by rivets 41 extending through the base or supporting plate 15.

The plug 36, therefore, is made of sufficient length to extend through shear plate 16, base plate 15 and skin 40. For different thicknesses of skin, flooring, ceiling, side wall, and for different mountings of the base plate, the plug may be lengthened or shortened so that in each instance in the closed position, the outer end of the plug will be flush with the exposed surface.

The supporting plate carrying the pivotally mounted shear plate and retainer, forms a thin, flat, light weight assembly of small over-all dimensions which can be readily mounted in flooring, walls or other locations.

The shape of the supporting plate may be varied to suit different requirements. Thus, it may be square, circular, oval, triangular, longitudinally extended in the form of a strip and the like.

Because of the reinforcement of one plate by the other, these elements may be made of relatively thin material, and to gain desired rigidity and stiffness the plates may be reinforced by flanging.

Thus the supporting plate 15 is shown as having an angular flange 42 about the rim of the same and the shear plate 16 is shown as having a similar reinforcing flange 43.

When used on pressurized cabin aircraft the fastener may be sealed by enclosing it in a cup such as shown at 44 in Fig. 8, made airtight with suitable gaskets 45.

When not in use for supporting, holding or securing purposes, the plug 36 provides a flush closure for the entrance to the fastener, as indicated in Fig. 1. This view shows also how the stud 25 for operating the fastener preferably is made of sufficient extent to have its outer, exposed end flush with the skin 40 or other surface in which the fastener is mounted.

In the position of non-use, the plug 36 extends through the larger portion 24 of the keyhole slot and thus, as indicated in Fig. 4, locks the shear plate 16 against turning.

In this relation, however, the plug is displaceable by pressure thereon and hence the fastener is ready to receive the end of a stud element such as shown at 20 in Fig. 2.

When so displaced by an entering stud the shear plate is unlocked and, except for the holding power exerted by the spring detent 30, 31, is free to be turned to engage the narrower slot portion 23 of the shear plate in the locking groove 22 in the stud.

This locked relation of the stud is shown in Fig. 3 with the spring detent 30, 31, holding the shear plate in such position.

While firmly secured by the spring detent in the stud locking position, the shear plate may be quickly released by applying turning force to the operating head 25 by a screwdriver or other such tool.

In some instances, for example where the fastener is mounted in a deck or flooring, it may be desirable to lock the plug in the closed position so as not to be displaceable by weight or pressure applied thereto.

For such purposes the plug may be constructed with a shoulder 46 at the back to line up with the shear plate when the plug is in the closed position shown in Fig. 9, so that in such relation of the parts the shear plate may be turned to lock the plug in place, as in Fig. 10. Then to release the plug to permit entry of the stud element 20, the shear plate may be turned back to the release position, Fig. 9, with the larger slot portion 24 of the shear plate in line with the entry opening in the supporting plate.

The support 40, as shown in Figs. 1 and 2, in addition to the bolt or stud receiving opening 18, has an opening 48 in line with the bearing opening in the supporting plate to receive the operating head or stud 25 of the shear plate so that this slotted operating head, as well as the plug, will be flush with the face of the support.

While in the form of the invention shown in Figs. 8, 9 and 10 the plug may be locked in the flush securing position, it is also possible to leave the plug free to be displaced by the entered bolt or stud, by leaving the shear plate in the open or unlocked position, with the larger end of the keyhole slot in line with the bolt or stud receiving opening.

What is claimed is:

1. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, and a support for said supporting plate, said supporting plate being mounted on the back of said support and said support having a bolt receiving opening in line with said bolt receiving opening in the supporting plate, said closure plug being of a length to extend through said shear plate, supporting plate and support, and stop means for locating the plug with the outer end of the same substantially flush with the outer face of the support, said spring means for projecting the plug being a spring arm and said arm being extended beyond the edge of the plug to engage the back of the shear plate and thereby constitute the stop means aforesaid.

2. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, said retainer being a spring plate secured to the back of said supporting plate and said spring means being a reversely bent spring arm projecting from said spring plate and doubled over said spring plate to afford free inward yielding movement of said plug.

3. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, and an airtight cover over the back of said supporting plate and comprising an enclosure sealed to the back of the supporting plate and providing free operating space for inward movement of said plug.

4. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, said plug having a shouldered portion to register with the shear plate when the plug is in position in the bolt receiving opening and of a diameter to receive the smaller end portion of the keyhole slot and whereby the shear plate may be turned to lock the plug in the closure forming position.

5. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, said retainer being a spring plate having an arm projecting in one direction into engagement with the shear plate and a second arm projecting in the opposite direction and doubled back over the spring plate and connected with the plug to form the spring means aforesaid.

6. A fastener for a bolt having an annular locking groove and comprising a supporting plate having a bolt receiving opening therethrough to pass that portion of the bolt having the locking groove therein and a bearing opening adjoining said bolt opening, a shear plate at the back of said supporting plate having a stud rotatably engaged in said bearing opening and having a keyhole slot with larger and smaller end portions to register respectively with said bolt opening in the swinging movement of the shear plate in opposite directions, the larger end portion of said keyhole slot being of greater diameter than the diameter of the bolt and the smaller end portion of said slot being of less width than the diameter of the bolt but of greater width than the diameter at the annular locking groove in the bolt, the slotted portion of said shear plate being of less thickness than the width of said locking groove and positioned to be in line with said groove when the bolt is entered in the fastener, a retainer holding said shear plate to the back of said supporting plate, a plug for closing said bolt receiving opening in the supporting plate, spring means yieldingly supporting said plug in line with and in axially displaceable relation in said opening in the supporting plate, a support for said fastener, said supporting plate being mounted at the back of said support and said support having openings therein in line with the bolt receiving opening and the bearing opening in the supporting plate, and said plug and stud extending into said openings into substantially flush relation with the outer surface of said support, said retainer being a spring plate secured to the back of said supporting plate over the shear plate and holding the latter with the stud flush with the outer surface of the support and said spring means being a doubled-over spring arm projecting from said spring plate, holding the plug projected flush with the outer surface of the support and engaging the back of the shear plate to locate said plug in said flush relationship.

References Cited in the file of this patent

UNITED STATES PATENTS

| | | |
|---|---|---|
| 945,753 | Chamberlain et al. | Jan. 11, 1910 |
| 1,251,085 | Moorman | Dec. 25, 1917 |
| 2,422,693 | McArthur | June 24, 1947 |
| 2,647,294 | Davis | Aug. 4, 1953 |